US006910121B2

(12) United States Patent
Savransky et al.

(10) Patent No.: US 6,910,121 B2
(45) Date of Patent: Jun. 21, 2005

(54) SYSTEM AND METHOD OF REDUCING THE NUMBER OF COPIES FROM ALIAS REGISTERS TO REAL REGISTERS IN THE COMMITMENT OF INSTRUCTIONS

(75) Inventors: Guillermo Savransky, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 10/039,113

(22) Filed: Jan. 2, 2002

(65) Prior Publication Data

US 2003/0126410 A1 Jul. 3, 2003

(51) Int. Cl.[7] ............................................... G06F 9/34
(52) U.S. Cl. ...................................................... 712/218
(58) Field of Search ................................... 712/23, 218

(56) References Cited

U.S. PATENT DOCUMENTS 6,314,511 B2 * 11/2001 Levy et al. .................. 712/217
6,604,190 B1 * 8/2003 Tran ........................... 712/207

OTHER PUBLICATIONS

A. Gonzales M. Valero, et al. "Virtual–Physical Registers", HPCA–4, Feb. 1998.

C. Molina, et al., "Reducing Memory Traffic Via Redundant Store Instructions", In Proceedings of the international Conference on High Performance Computing and Networking, Apr. 1999.

Kevin M. Lepak, et al. "On the Value Locality of Store Instructions", In Proceedings of the 27th Annual International Symposium on Computer Architecture, Jun. 2000.

* cited by examiner

Primary Examiner—Eric Coleman
(74) Attorney, Agent, or Firm—Blakely, Sokoloff, Taylor & Zafman LLP

(57) ABSTRACT

A processor system and method that reduces the number of register value copying made from alias registers to corresponding real (architectural) registers. The method entails determining whether to copy the register value generated by executing an instruction from the alias register to the real register at the time the reorder buffer entry associated with the alias register is needed for a new instruction. If before the reorder buffer is needed for a new instruction, an interim instruction resulted in a new register value for the real register, then the original register value would be invalid at the time the reorder buffer entry is needed for the new instruction. Thus, there would not be a need to copy the original register value to the real register. The reduction in copying can make the processor system consume less power.

16 Claims, 3 Drawing Sheets

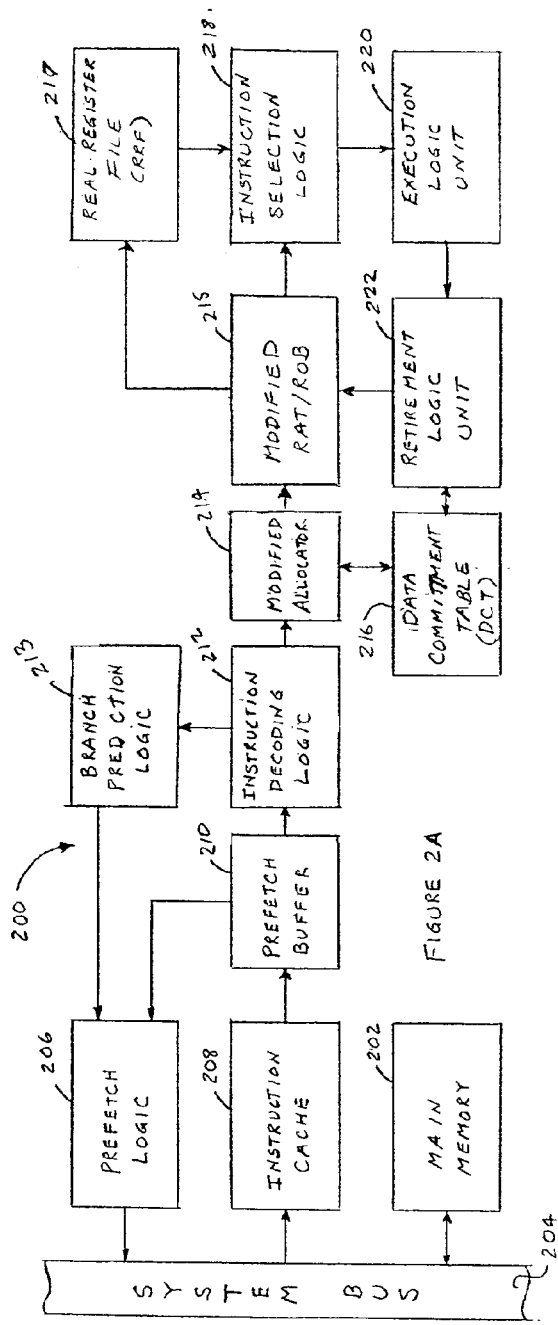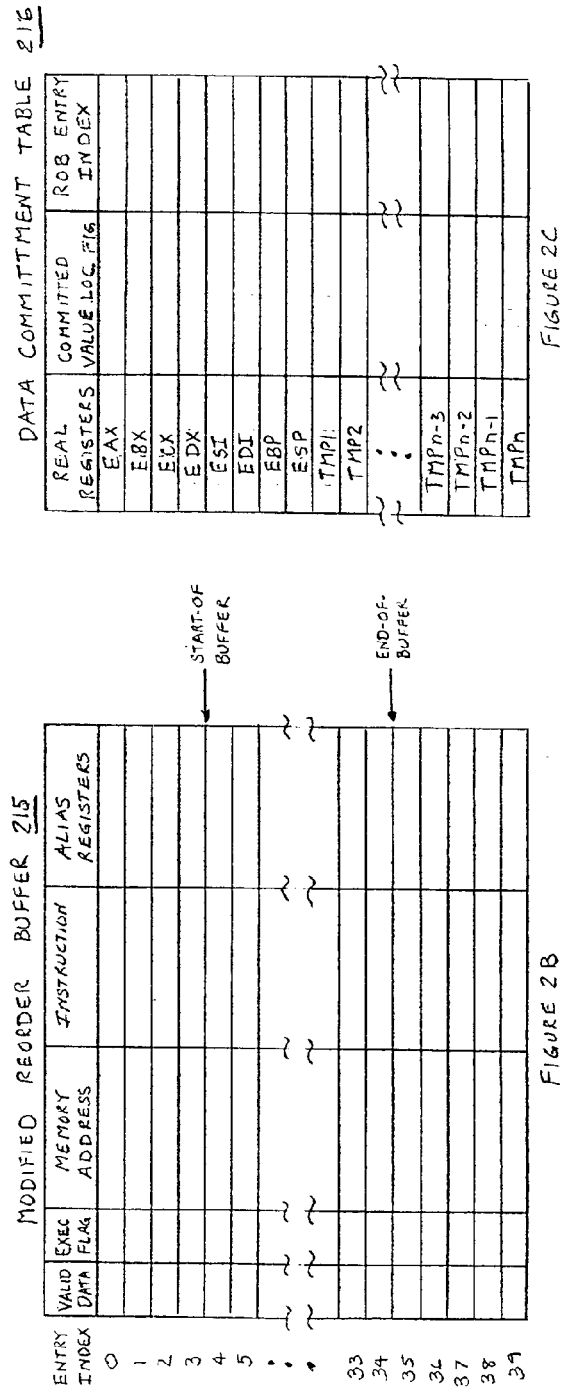

SYSTEM AND METHOD OF REDUCING THE NUMBER OF COPIES FROM ALIAS REGISTERS TO REAL REGISTERS IN THE COMMITMENT OF INSTRUCTIONS

FIELD OF THE INVENTION

This invention relates generally to processors, and in particular, a system and method of reducing the number of copies from alias registers to real registers in the commitment of instructions.

BACKGROUND OF THE INVENTION

Developments in processors, such as microprocessors, microcontrollers, etc., are always on-going. The reason being is that there is a large demand for microprocessors to process instructions faster to reduce the execution time of a program, and more efficiently to reduce their overall power consumption. Techniques such as out-of-order processing, where instructions are executed not in the order provided by the program, have improved the performance of current processors. Even though the performance of processors have improved over the recent years, there are still some room for further improvement in the performance as illustrated in the following example.

FIG. 1A illustrates a block diagram of a prior art processor system 100. In general, the processor system 100 retrieves program instructions initially stored in a main memory 102 by way of a system bus 104, and performs the execution of the program instructions. The processor system 100 consists of an instruction-retrieval front end including an instruction cache 108, a prefetch buffer 110, and a prefetch logic 106. The processor system 100 further consists of a pre-processing stage including an instruction decoding logic 112 and a branch prediction logic 113. Finally, the processor system 100 consists of an execution processing stage including an allocator 114, a register alias table/reorder buffer (RAT/ROB) 115, a real (architectural) register file (RRF) 116, an instruction selection logic 118, an execution logic unit 120, and a retirement logic unit 122.

In operation, the instruction-retrieval front end of the processor system 100 functions to place instructions in the pipeline for execution. Specifically, the prefetch logic periodically issues requests for instructions from the main memory 102 by way of the system bus 104. In response to these requests, instruction data is transferred to the instruction cache 108. The prefetch logic 106 also causes sequential instruction data of a certain size (e.g. 16 bytes of instruction data at a time) to transfer from the instruction cache 108 to the prefetch buffer 110. The prefetch buffer 110 stores a certain amount of sequential instruction data (e.g. 32 bytes). When the prefetch buffer 110 empties, a signal is sent to the prefetch logic 106 instructing it to transfer another 32 bytes of instruction data from the instruction cache 108 to the prefetch buffer 110 (e.g. 16-bytes at a time).

The pre-processing stage of the processor system 100 generally entails preparing the instruction data for subsequent processing by the execution stage. Specifically, the instruction decoding logic 112 receives the 32 bytes of instruction data from the prefetch buffer 110 and identifies the actual instructions within the instruction data by marking boundaries between instructions. If the processor system 100 processes sub-instructions such as micro-ops (i.e. fixed-length RISC instructions), then the instruction decoding logic 112 translates the identified instructions into micro-ops. If the instruction received is a branch, the address from which the instruction was accessed is sent to the branch prediction logic unit 113 to predict where the program will branch to. The branch prediction logic 113, based on its prediction determination, instructs the prefetch logic 106 to sequentially transfer the corresponding instructions to the prefetch buffer 110.

The execution stage of the processor system 100 generally entails queing, scheduling, executing, and retiring the instructions. The allocator 114 sequentially adds new instructions into the end of the reorder buffer (ROB) 115. The register alias table (RAT) portion of the RAT/ROB 115 assigns alias registers to function as real registers 116 for instructions that use source operands. The register alias table (RAT) keeps track of which real register 116 does an alias register corresponds.

As shown in FIG. 1B, each reorder buffer (ROB) entry includes a first field to indicate whether the corresponding instruction has been executed, a second field to store the memory address of the instruction to branch to if the corresponding instruction is a branch, a third field to store the corresponding instruction, and a fourth field to identify the corresponding alias registers holding the source operands for the corresponding instruction. The reorder buffer (ROB) 115 is a cyclic buffer having a start-of-buffer pointer that points to the first entry of the reorder buffer (ROB) 115, such as entry four (4) as shown, and an end-of-buffer pointer that points to the last buffer entry, such as entry 36 as shown. Thus, the entry pointed to by the start-of-buffer pointer contains the oldest instruction in the reorder buffer (ROB) 115 and the entry pointed to by the end-of-buffer pointer contains to the youngest instruction in the reorder buffer (ROB) 115.

The instruction selection logic 118 selects and queues the instructions to be executed. The instructions can be selected out-of order. The criteria used by the instruction selection logic 118 to select an instruction is whether all prior conditions have been met for the instruction to execute. The execution logic unit 120 executes the instructions in the order selected by the instruction selection logic 118. After the instruction has been successfully executed, the retirement logic unit 122 sets the executed flag in the reorder buffer (ROB) 115. If and when the executed instruction becomes the oldest instruction in the reorder buffer (ROB) 115, the instruction is committed, and the retirement unit 122 causes the copying of the register result of the executed instruction from the corresponding alias register to the designated real register 116.

It is this copying that results in some inefficienices in the processor system 100. The copying is expensive in terms of power consumption since it includes reading and writing operations. Reducing the number of copies from alias registers to the real register file (RRF) could result in lower power consumption, extended battery life and a less sophisticated cooling system for the processor.

BRIEF DESCRIPTION OF THE DRAWINGS

FIG. 2A illustrates a block diagram of an exemplary processor system in accordance with an embodiment of the invention;

FIG. 2B illustrates a table diagram of an exemplary modified reorder buffer (ROB) in accordance with an embodiment of the invention;

FIG. 2C illustrates a table diagram of an exemplary data commitment table (DCT) in accordance with an embodiment of the invention;

DETAILED DESCRIPTION OF THE INVENTION

Figures 1A, 1B:
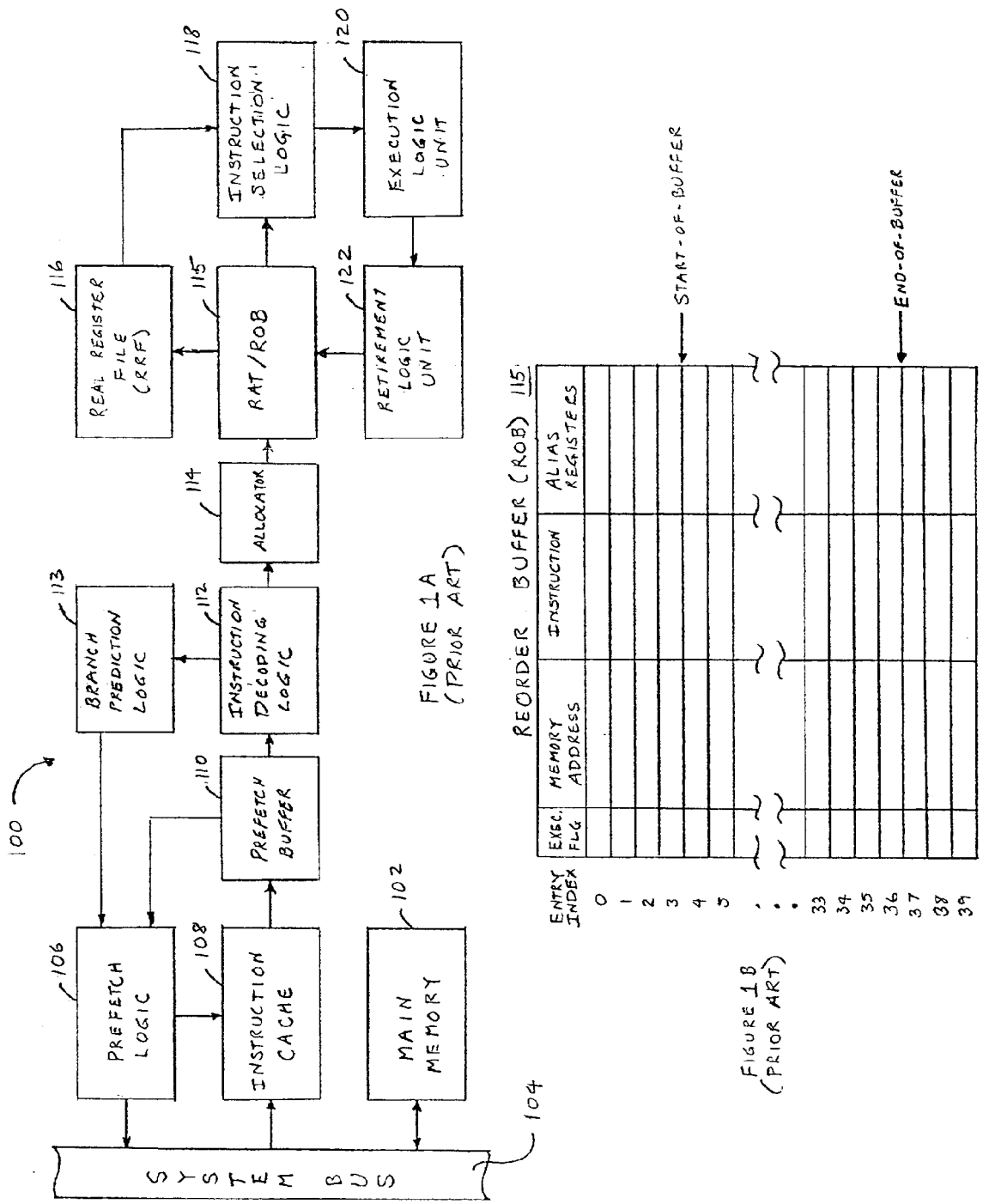
FIG. 1A illustrates a block diagram of a prior art processor system.
FIG. 1B illustrates a block diagram of a prior art reorder buffer as part of the prior art processor system.

FIG. 2A illustrates a block diagram of an exemplary processor system 200 in accordance with an embodiment of the invention. In general, the processor system 200 retrieves program instructions initially stored in a main memory 202 by way of a system bus 204, and performs the execution of the program instructions. The processor system 200 comprises an instruction-retrieval front end including an instruction cache 208, a prefetch buffer 210, and a prefetch logic 206. The processor system 200 further comprises a pre-processing stage including an instruction decoding logic 212 and a branch prediction logic 213. The processor system 200 also comprises an execution processing stage including a modified allocator 214, a modified register alias table/reorder buffer (RAT/ROB) 215, a data commitment table 216, a real register file (RRF) 217, an instruction selection logic 218, an execution logic unit 220, and a retirement logic unit 222. The instruction-retrieval front end and the pre-processing stage of the processor system 200 performs the instruction fetching and prediction the same as described with reference to the prior art processor system 100.

It is in the execution processing stage where the method of reducing the number of copies from alias registers to real registers in the commitment of instructions is implemented. In general, the method entails determining whether to copy the register value generated by executing an instruction from the alias register to the real register at the time the reorder buffer entry associated with the alias register is needed for a new instruction. If before the reorder buffer is needed for a new instruction, an interim instruction resulted in a new register value for the real register, then the original register value would be invalid at the time the reorder buffer entry is needed for the new instruction. Thus, there would not be a need to copy the original register value to the real register. The reduction in copying can make the processor system consume less power and execute instructions faster and more efficiently.

More specifically, the execution stage of the processor system 200 generally entails queing, scheduling, executing, and retiring the instructions. The modified allocator 214 performs several functions. The allocator 214 first checks whether a candidate ROB entry for a new instruction has valid register data. If it does, the allocator 214 causes a copying of the register data from the alias register to the corresponding real register. Second, the allocator 214 updates the data commitment table so that it indicates that the register data is now in the real register. Third, the allocator 214 deasserts the valid data bit in the candidate ROB entry. Finally, the allocator 214 causes the copying of the new instruction information into the candidate ROB entry.

The register alias table (RAT) portion of the modified RAT/ROB 215 assigns alias registers to function as real registers 217 for instructions that use source operands. The register alias table (RAT) keeps track of which real register 217 does an alias register corresponds.

FIG. 2B illustrates a table diagram of an exemplary modified reorder buffer (ROB) 215 in accordance with an embodiment of the invention. Each reorder buffer (ROB) includes: a first field to indicate whether the corresponding alias register holds valid data, a second field to indicate whether the corresponding instruction has been executed, a third field to store the memory address of the instruction to branch to if the corresponding instruction is a branch, a fourth field to store the corresponding instruction, and a fifth field to identify the corresponding alias registers holding the source operands for the corresponding instruction. The reorder buffer (ROB) 215 is a cyclic buffer having a start-of-buffer pointer that points to the first entry of the reorder buffer (ROB) 215, such as entry four (4) as shown, and an end-of-buffer pointer to point to the last entry of the reorder buffer (ROB) 215, such as entry 34 as shown. Thus, the entry pointed by the start-of-buffer pointer is the oldest instruction in the reorder buffer (ROB) 215 and the entry pointed to by the end-of-buffer pointer is the youngest instruction in the reorder buffer (ROB) 215.

Referring back to FIG. 2A, the instruction selection logic 218 selects and queues the instructions to be executed. The instructions can be selected out-of order. The criteria used by the instruction selection logic 218 to select an instruction is whether all conditions for executing the instruction have been met. The execution logic unit 220 executes the instructions in the order selected by the instruction selection logic 218. After the instruction has been successfully executed, the retirement logic unit 222 assists in the retirement of instructions in accordance with a new method in accordance with the invention, as is discussed below with reference to FIG. 3. A data commitment table 216 will be used to keep track of the location of committed register data as discussed below with reference to FIGS. 3–4.

FIG. 2C illustrates a table diagram of an exemplary data commitment table 216 in accordance with an embodiment of the invention. The data commitment table 216 provides information as to the location of the register values for the corresponding real registers, i.e. whether a register value is in the real register file 217 or in an alias register identified in the ROB 215. Each data commitment table entry includes a first field to identify the real register, a second field to indicate whether the register value is in the corresponding real register (e.g. a Boolean field, a flag, etc.), and a third field to indicate the ROB entry index identifying the alias register storing the register value if the second field indicates that the register value is not in the real register.

Figure 3:
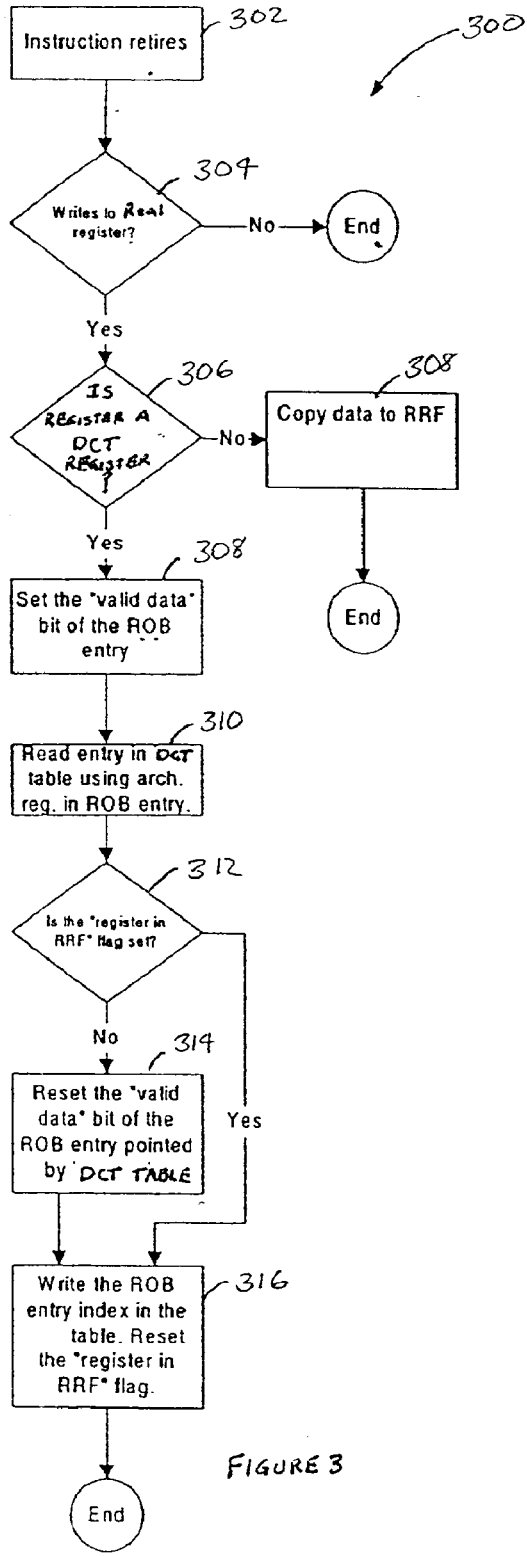
FIG. 3 illustrates a flow diagram of an exemplary retirement routine in accordance with an embodiment of the invention.

FIG. 3 illustrates a flow diagram of an exemplary retirement routine 300 in accordance with an embodiment of the invention. The operations of the retirement routine are taken after a successful execution of an instruction. In block 302, the retirement logic unit 222 sets the executed flag in ROB entry corresponding to the instruction. In block 304, the retirement logic unit 222 determines whether there is a destination real register 217 for the instruction. If there is no destination real register 217 for the instruction, the retirement routine 300 ends. If, on the other hand, thee is a destination real register 217 for the instruction, in block 306 the retirement logic unit 222 determines whether the real register 217 is designated to undergo the retirement routine 300 in accordance with the invention (i.e., whether the register is one listed in the data commitment table 216).

Not all the real registers of the processor system 300 need to undergo the new retirement routine in accordance with the invention. It may be desirable to not include some real registers in the new retirement scheme. In such a case, at the time of retirement, the value generated by the executed instruction is copied to the corresponding register. For example, in the X86 processor, the segment and control registers can be excluded. There is only a small possibility that the segment and control registers are updated within the same instruction window (the size of the ROB). Thus, there is little to be gained, since almost every write to these registers will be copied to the real registers when a new instruction is to occupy the corresponding ROB entry. Also, not including all the real registers in the new retirement routine 300 reduces the size of the data commitment table and reduces the overall power consumption. In addition, instruction that writes a value into partial registers may also be excluded from the new retirement routine 300.

Accordingly, if in block 306 the retirement logic unit 222 determines that the real register be written to is exempt form the new retirement routine 300, then in block 308 the retirement logic unit 222 causes the copying of the resulting data from the alias register to the real register. Otherwise, in block 308, the retirement logic unit 222 causes the setting of the valid data bit in the ROB entry pertaining to that instruction. In block 310, the retirement logic unit 222 reads the committed value location field or the data commitment table 216 corresponding to the real register to determine if the previous register value is in the real register or in an alias register. If the retirement logic unit 222 determines that the previous register value is in an alias register, in block 314 the retirement logic unit 222 causes a deasserting of the valid data bit of the ROB entry pointed to by the data commitment table 216. Then in block 316 the retirement logic unit 222 causes the writing of the ROB entry index of the instant instruction to the ROB entry index field of the data commitment table 216 corresponding to the real register associated with the new data, and modifies the committed data location field to indicate that the register value is in an alias register pointed to by the corresponding ROB entry index field. If, on the other hand, in block 314 the retirement logic unit 222 determines that the previous register value is in the RRF 217, the retirement logic unit 222 just performs the function specified in block 316 as previously discussed.

The new retirement routine 300 saves an alias register-to-real register copying block (relative to the prior art retirement routine) each time the retirement routine 300 performs block 314. This situation occurs when the same real register is written to (actually written to its alias in the ROB) by two or more instructions within the same instruction window (the size of the ROB). This is substantially different than the prior art retirement routine that makes an alias register-to-real register coy each time an instruction retires. Whereas the new retirement routine 300, avoids some of these copies, and in theory, can eliminate essentially 100 percent of the register writes if the code reuses results extensively, e.g. a long series of "inc eax; inc eax; inc eax, . . . ". Accordingly, the reduction in real register copying ahs the beneficial results of lower power consumption, extended battery life and a less sophisticated cooling system for the processor, among other benefits.

Figure 4:
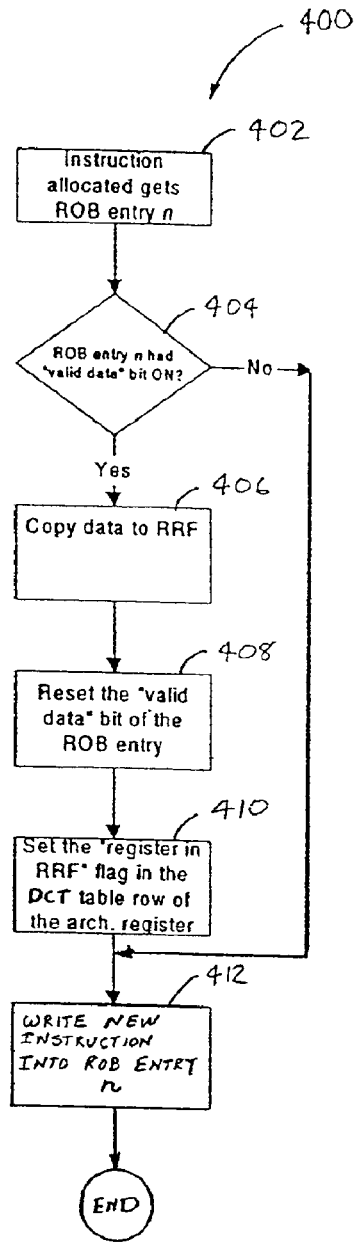
FIG. 4 illustrates a flow diagram of an exemplary ROB entry allocating routine in accordance with an embodiment of the invention.

FIG. 4 illustrates a flow diagram of an exemplary ROB entry allocating routine 400 in accordance with an embodiment of the invention. Basically, the allocator 214 first checks to see if the candidate ROB entry for a new instruction has valid data. As previously discussed, an ROB entry can have valid data if within a period of the cyclic ROB, the real register corresponding to the candidate ROB entry was not written to more than once by retired instructions. In this case, before the allocator 214 can use the candidate ROB entry, it has to cause a copying of the alias register of the ROB entry to the corresponding real register 217. Once this has occurred, the allocator 214 can use the candidate ROB entry for the new instruction.

Specifically, the block in 402 the allocator 214 locates the next ROB entry n for a new instruction. In block 404, the allocator 214 read reads the valid data field of the next ROB entry n to determine whether the corresponding alias register contains valid data. If not, the allocator 214 proceeds to block 412 to add the new instruction into the next ROB entry n. If, however, the valid data field indicates that the next ROB entry n has valid data, in block 406 the allocator 214 causes the content in the alias register of the next ROB entry n to be copies in to the corresponding real register 217. In block 408, the allocator 214 deasserts the valid data bit in the next ROB entry n since the new instruction has not been executed, and therefore the next ROB entry n has yet to have valid data. Then in block 410 the allocator 214 modifies the "committed value location" field of the data commitment table 216 to indicate that the register value for the corresponding real register is now in the real register 217. Finally, in block 412 the allocator 214 causes the new instruction to be added into the next ROB entry n.

In the case that there has been a branch misprediction, or other control flow altering event, like an exception, all the non-committed registers younger than the branch in the ROB 215 are invalid. In the prior art processor system, all non-committed register are discarded by setting the renamer tables to point to all the registers last value to RRF. However, according to the new processor system 200, some of the committed data will reside in the ROB 215. According to the processor 200 of the invention, this can be dealt with in two manners. The first option is to copy the committed data in the ROB 215 to the RRF 217 in the time the pipeline fills up again. The second option is to make the pointers in the renamer to point to the ROB entry that the data commitment table indicates. For example, if an instruction that writes to the EAX register is committed form the ROB entry index 31, the data commitment table entry corresponding to the EAX will contain the number 31 in the corresponding ROB entry index field. After a branch misprediction, the renamer will now point to the last value of the EAX to ROB entry 31. An instruction that has a source the register EAX, will gets its source renamed to ROB entry 31, so it will get the correct data.

In the case that the processor system 200 uses micro-ops, temporary registers are used to keep intra-instruction information. The values of these registers are invalid outside the instruction micro-sequence and have no meaning to any micro-instruction that belongs to an instruction different to the one that generated the value. This fact can be used to improve power saving in the processor system 200. Specifically, any time that the last micro-ops of an instruction is retired, the "valid bit" in all the ROB entries corresponding to temporary registers can be reset. These values are not relevant anymore so there is no need to copy them to the RRF.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

It is claimed:

1. A method comprising:
   providing a reorder buffer comprising a plurality of entries associated respectively with a plurality of instructions;

executing a first instruction of said plurality of instructions which generates a first register value for a first real register, said first register value being stored in a first alias register identified in a first entry of said reorder buffer associate with said first instruction;

determining whether said first register value should be copied from said first alias register to said first real register approximately at a time when first entry of said reorder buffer is needed for a second instruction that is younger in order than said first instruction;

providing a data commitment table comprising a plurality of entries associated respectively with a plurality of real registers including a first entry associated with said first real register, said first entry of said data commitment table comprising a committed data location field to indicate if a second register value generated by a third instruction is stored in a second alias register or in said first real register, and a reorder buffer index field to identify a second entry of said reorder buffer containing said, second alias register if said second register value is stored in said second alias register;

determining whether said second register value is in said second alias register or in said first real register by reading said committed data location field of said data commitment table;

deasserting a second valid data field of said second entry of said reorder buffer if it is determined that said second register value is in said second alias register to indicate that said second register value is not valid for copying from said second alias register to said first real register; and writing an identifier for said first entry of said reorder buffer in said reorder buffer index field of said first entry of said data commitment table.

2. The method of claim 1, asserting a first valid data field of said first entry of said reorder buffer after said execution of said first instruction but before said determining whether said first register value should be copied from said first alias register to said first real register, said asserted first valid data field indicates that said first register value is valid for copying from said first alias register to said first real register.

3. The method of claim 2, further comprising reading said first valid data field in determining whether said first register value should be copied from said first alias register to said first real register.

4. The method of claim 3, further comprising copying said first register value from said first alias register to said first real register if said first valid data field indicates that said first register value is valid for copying into said first real register.

5. The method of claim 2, further comprising deasserting a second valid data field of a second entry of said reorder buffer, said second entry including a second alias register previously associated with said first real register, said deasserted second valid data field indicates 4 that said second register value is not valid for copying from said second alias register to said first 5 real register.

6. A processor system comprising:

a reorder buffer comprising a plurality of entries associated respectively with a plurality of instructions;

an execution unit to execute a first instruction of said plurality of instructions which generates a first register value for a first real register, said execution causing said first register value to be stored in a first alias register identified in a first entry of said reorder buffer associate with first instruction;

an allocator to add new instructions into said reorder buffer;

a data commitment table comprising a plurality of entries associated respectively with a plurality of real registers including a first entry associated with said first real register, said first entry of said data commitment table comprising a first committed data location field to indicate if a second register value generated by a third instruction is stored in a second alias register associated with said first real register or in said first real register, and a reorder buffer index field to identify a second entry of said reorder buffer identifying said second alias register if said second register value is stored in said second alias register;

a retirement unit to determine whether said second register value, is in said second alias register or in said first real register by reading said first committed data field of said data commitment table, to causes a deasserting of a second valid data field of said second entry of said reorder buffer if said retirement unit determines that said second register value is in said second alias register, said deasserted indicates that said second register value is not valid for copying from said second alias register to said first real register, and to causes a writing of an identifier for said first entry of said reorder buffer in said buffer index field of said first entry of said data commitment table.

7. The processor system of claim 6, wherein said allocator determining whether said first register value should be copied from said first alias register to said first real register approximately at a time when said allocator determines that said first entry of said reorder buffer is needed for a second instruction that is younger in order than said first instruction.

8. The processor system of claim 6, wherein said retirement unit to assert a 2 first valid data field of said first entry of said reorder buffer after said execution unit has executed 3 said first instruction but before said allocator determines whether said first register value should be copied from said first alias register to said first real register, said asserted first valid data field 5 indicates that said first register value is valid for copying from said first alias register to said first 6 real register.

9. The processor system of claim 8, wherein said allocator reads said first valid data field in determining whether said first register value should be copied from said first alias register to said first real register.

10. The processor system of claim 9, wherein said allocator causes a copying of said first register value from said first alias register to said first real register if said first valid data field indicates that said first register value is valid for copying into said first real register.

11. The processor system of claim 8, wherein said retirement unit causes a deasserting of a second valid data field of a second entry of said reorder buffer, said second entry identifying a second alias register previously associated with said first real register, said deasserted second valid data field indicates that said second register value is not valid for copying from said second alias register to said first real register.

12. A computer readable medium adapted for execution by a processor comprising one or more software modules to:

generate a reorder buffer containing a plurality of entries associated respectively with a plurality of instructions;

execute a first instruction of said plurality of instructions which generates a first register value for a first real register, said first register value being stored in a first alias register identified in a first entry of said reorder buffer associated with said first instructions;

determine whether said first register value should be copied from said first alias register to said first real register approximately at a time when said first entry of said reorder buffer is needed for a second instruction that is younger in order than said first instruction;

provide a data commitment table comprising a plurality of entries associated respectively with a plurality of real registers including a first entry associated with said first real register, said first entry of said data commitment table comprising a committed data location field to indicate if a second register value generated by a third instruction is stored in a second alias register or in said real register, and a reorder buffer index field to identify a second entry of said reorder buffer containing said second alias register if said second register value is stored in said second alias register;

determine whether said second register value is in said second alias register or in said first real register by reading said committed data location field of said data commitment table;

deassert a second valid data field of said second entry of said reorder buffer if it is determined that said second register value is in said second alias register, said deasserted indicates that said second register value is not valid for copying from said second alias register to said first real register; and write an identifier for said first entry of said reorder buffer in said reorder buffer index field of said first entry of said data commitment table.

13. The computer readable medium of claim 12, wherein said one or more software modules to further assert a first valid data field of said first entry of said reorder buffer after said execution of said first instruction but before said determining whether said first register value should be copied from said first alias register to said first real register, said asserted first valid data field indicates that said first register value is valid for copying from said first alias register to said first real register.

14. The computer readable medium of claim 13, wherein said one or more software modules to further cause a reading of said first valid data field in determining whether said first register value should be copied from said first alias register to said first real register.

15. The computer readable medium of claim 14, wherein said one or more software modules to further cause a copying of said first register value from said first alias register to said first real register if said first valid data field indicates that said first register value is valid for copying into said first real register.

16. The computer readable medium of claim 13, wherein said one or more software modules to further cause a deasserting of a second valid data field of a second entry of said reorder buffer, said second entry including a second alias register previously associated with said first real register, said deasserted second valid data field indicates that said second register value 5 is not valid for copying from said second alias register to said first real register.

* * * * *